(No Model.) 3 Sheets—Sheet 2.
G. J. CROPP.
DUMP WAGON.

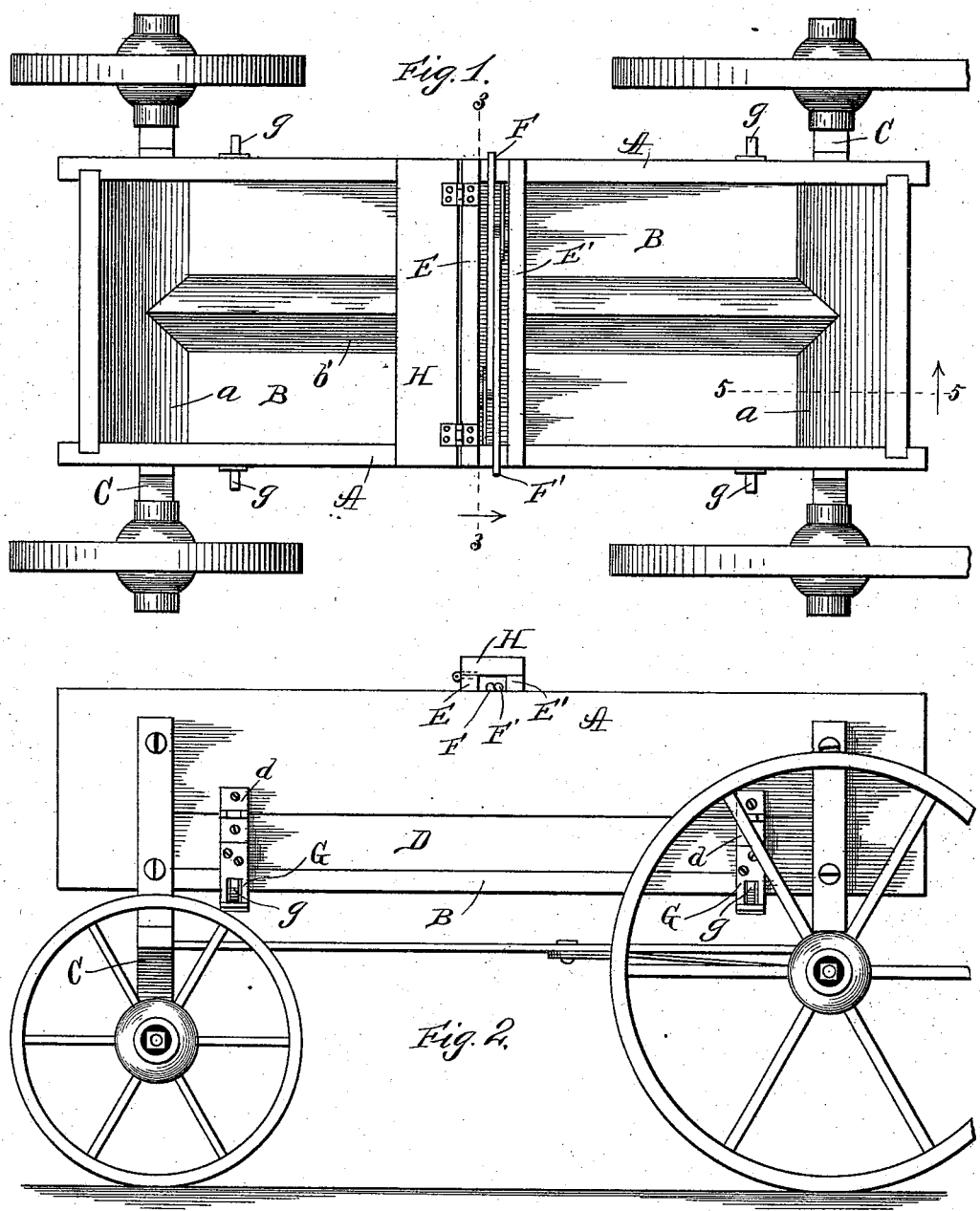

No. 540,484. Patented June 4, 1895.

Witnesses:
W. C. Coulies
Jno. A. Christianson.

Inventor:
George J. Cropp
By Louis K. Gleeson
Atty.

(No Model.) 3 Sheets—Sheet 3.
G. J. CROPP.
DUMP WAGON.
No. 540,484. Patented June 4, 1895.
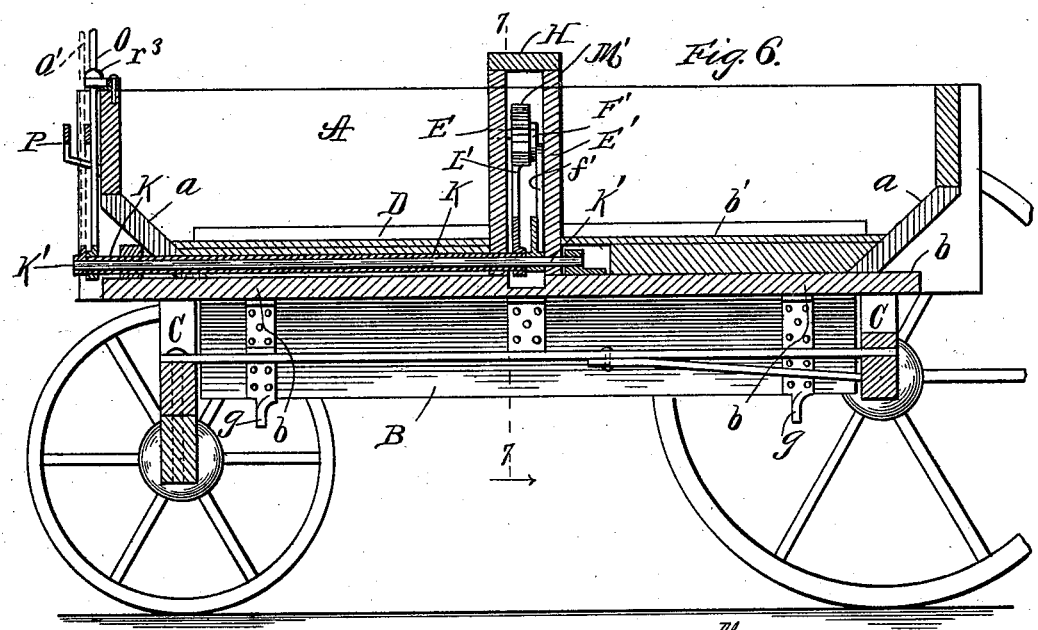
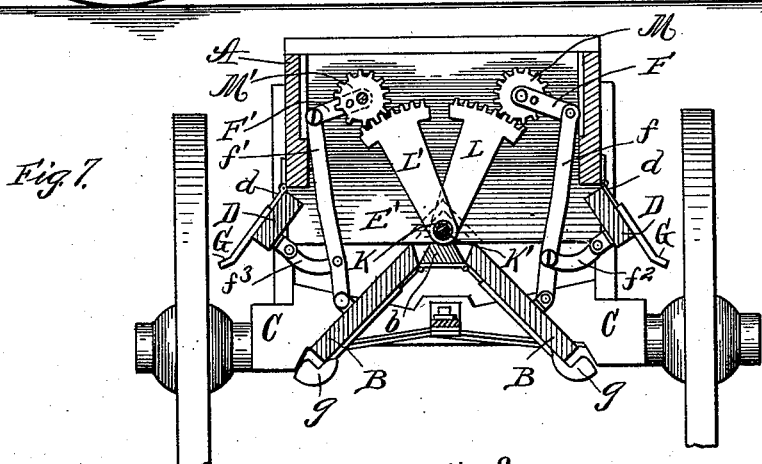
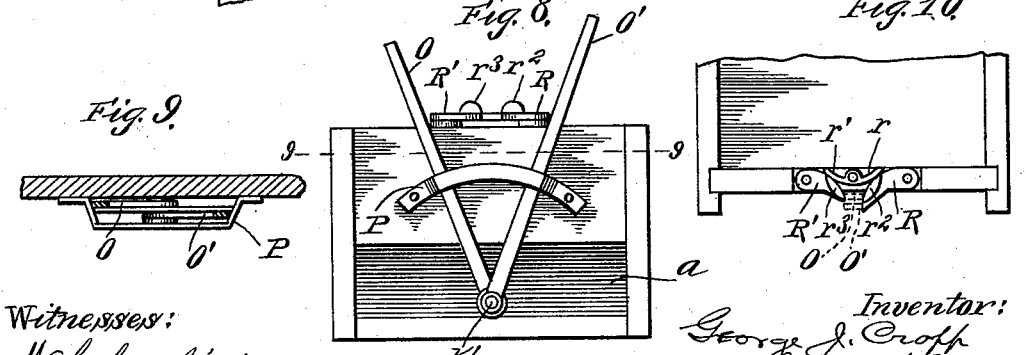
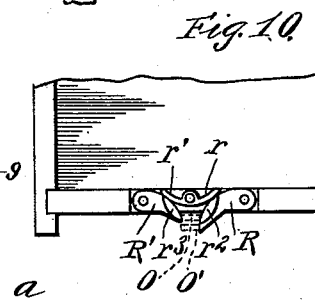
Witnesses:
W. C. Coelies
Jno. A. Christianson.
Inventor:
George J. Cropp
By Louis K. Gibson
Atty.

UNITED STATES PATENT OFFICE.

GEORGE J. CROPP, OF CHICAGO, ILLINOIS, ASSIGNOR TO WILLIAM LAW, OF SAME PLACE.

DUMP-WAGON.

SPECIFICATION forming part of Letters Patent No. 540,484, dated June 4, 1895.

Application filed July 9, 1894. Serial No. 516,884. (No model.)

*To all whom it may concern:*

Be it known that I, GEORGE J. CROPP, a citizen of the Dominion of Canada, residing at Chicago, in the county of Cook and State of Illinois, have invented certain new and useful Improvements in Dump-Wagons; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to the construction of the boxes of dump wagons and to the mechanism for operating the dump.

Its object is to secure quick action, wide dumping passages, and to safely lock the dump against accidental opening.

The invention consists of a box having the outer portions of its bottom, and the lower portion of its sides openable; of a system of levers for controlling such portions.

Figure 3:
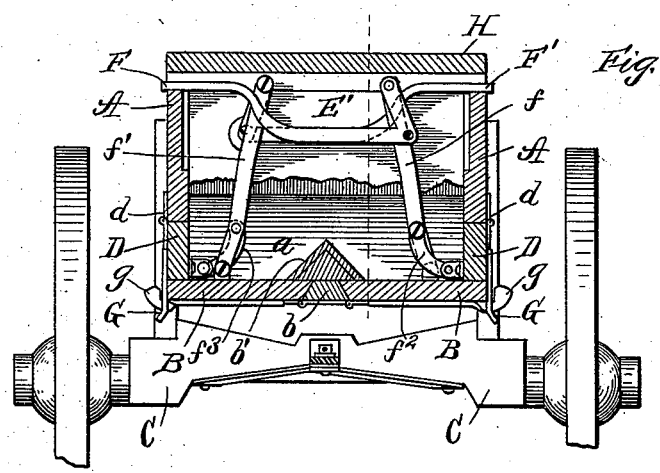
Figure 4:
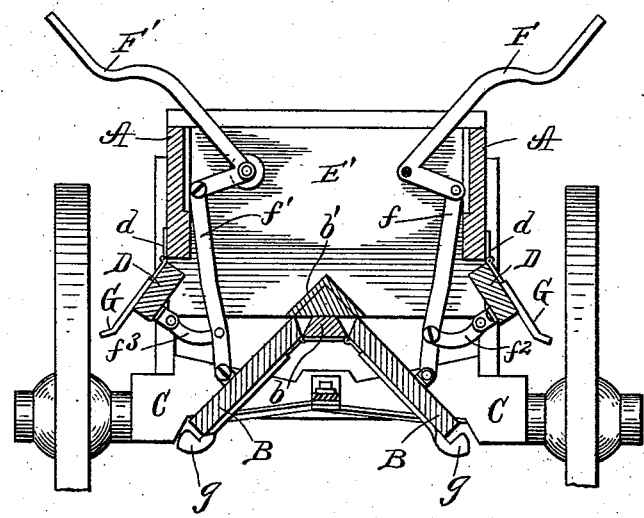
Figure 5:
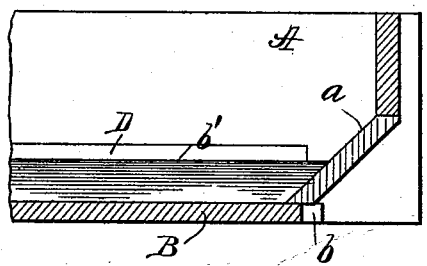

In the drawings, Figure 1 is a plan view of my wagon. Fig. 2 is a side elevation of the same. Fig. 3 is a transverse vertical section on the line 3 3 of Fig. 1, the dump being closed. Fig. 4 is the same view, the dump being open. Fig. 5 is a detail on the line 5 5 of Fig. 1. Fig. 6 is a central longitudinal vertical section of the wagon, showing one manner of operating the controlling mechanism. Fig. 7 is a sectional view on the line 7 7 of Fig. 6. Figs. 8, 9, and 10 are details.

The body, A, of my wagon is substantially oblong or rectangular in form. The lower portion, *a*, of its ends incline inwardly to or beyond the inner line of the bolsters, C, C. The central portion, *b*, of the bottom of the body is stationary and rests upon the bolsters, C, C. A cap, *b'*, in the form of an inverted V covers and is a little wider than the central section, *b*, of the body bottom. Upon each side of the section, *b*, and hinged to it so as to fold downwardly, is a leaf, B, of sufficient width to reach to the side of the body. The cap, *b'*, covers the joints between the fixed part, *b*, and the swinging portions, B, and prevents the dirt from entering them.

The sides of the body, A, are longitudinally divided; their upper portions being fixed, and their lower portions, D, D, being hinged to this fixed portion, so as to swing outwardly. The swinging portion of the sides may be of any desired width; as shown, they each constitute about one-third of the side of the body. Each leaf, B, of the bottom and the adjacent movable section, D, of the side is controlled by a single bell-crank lever, F, F'. These levers, F, F' are located between two transverse partitions, E, E', located near the middle of the wagon; each of these partitions carrying one of the levers by means of a stud. A link bar, $f, f'$, connects the short arm of each of the levers, F, F', with the leaf, B, with which it co-operates, and link bars, $f^2$, $f^3$, lead from the link bars, $f, f'$, to the swinging portions, D, of the sides.

The bell-crank levers, F, F', are fulcrumed near the top of the partitions, E, E', and adjacent to the sides of the body with which they co-operate. Their long arms are curved somewhat so that when thrown down the portion near the fulcrum is horizontal and the outer end rests upon the farther side of the body. The two arms of these levers form a slightly acute angle, so that when the long arm is thrown down, the outer end of the short arm is carried beyond a perpendicular line passing through the fulcrum, so that the strain of the link bar, $f, f'$ tends to hold the long arm of the lever down. When the long arm of the lever is raised to the position shown in Fig. 4, the leaf, B, is lowered and the lateral movement of the link bar, $f$, or $f'$, as its upper end moves through the arc of a circle, forces out the movable portion, D, of the side of body.

A pair of socket irons, G, G, depend from each of the parts, D, D, and a pair of hook-shaped bars, *g, g*, are rigidly attached to each of the leaves, B, B, projecting beyond the edges thereof, so as to engage the sockets of the irons, G, when the dump is closed and thus co-operate with the locking feature of the lever system as already described.

A cover, H, is hinged to the top of one of the partitions, E, E', so as to fold over onto the other and cover the mechanism for controlling the dump.

As shown in Figs. 6 to 10, the dump may be operated from the end of the wagon instead of by means of the hand levers, F, F'. To ccomplish this, I use a pair of rock shafts, K, K', journaled within the cap, b', and extending from the dump operating mechanism to and beyond one end of the body. The shaft, K, is shorter than, and incloses as a sleeve the shaft, K'. A gear sector, L, L', is mounted upon the inner end of each of these shafts, and co-operates with a pinion, M, M', journaled upon the studs, serving as the fulcrum for the levers, F, F'. The short arms only of these levers are used, and they are rigidly secured to the pinions M, M'.

Hand levers, O, O', are fixed upon the outer ends of the rock shafts, K, K', and project upwardly through guide loops, P, secured to the end of the body, A. The sectors, L, L', being of much greater radius than the pinions, M, M', but slight angular movement of the levers, O, O', is necessary to open the dump. When these levers are vertical, the dump is closed. When thrown to the side, as shown in Fig. 8, the dump is open.

A pair of spring latches, R, R', are mounted upon the top of the end of the body, A, and are normally held across the path of the levers, O, O', by the springs, r, r', and are adapted to lock them in their vertical position. Each of the latches has an upwardly projecting lug, $r^2$, $r^3$, for convenience in forcing it back to release the lever.

I claim as my invention—

1. In a dump wagon, the combination with swinging sections of the sides and bottom adapted to close together, and to open outwardly, of a bell-crank lever for controlling cooperating sections, and link connection between the bell-crank and such sections, substantially as described, and for the purpose specified.

2. In a dump wagon, the combination with swinging sections of the sides and bottom adapted to close together, and to open outwardly, of a bell-crank lever for controlling cooperating sections, and link connection between the bell-crank and such sections, the link being adapted to pass beyond the fulcrum point of the lever in closing the sections, for the purpose of locking the dump, substantially as described, and for the purpose specified.

3. In a dump wagon, the combination with swinging sections of the sides and bottom adapted to close together, and to open outwardly, of a bell-crank lever for controlling cooperating sections, link connection between the bell-crank and such sections, and means for actuating the lever from the end of the wagon, substantially as described, and for the purpose specified.

4. In a dump wagon, the combination with swinging sections of the sides and bottom adapted to close together, and to open outwardly, of a bell-crank lever for controlling cooperating sections, link connection between the bell-crank and such sections, a rock shaft journaled longitudinal with the wagon, means for rocking the shaft and connection between the rock shaft and the lever, whereby the movement of the shaft actuates the lever, substantially as described, and for the purpose specified.

In testimony whereof I affix my signature in presence of two witnesses.

GEORGE J. CROPP.

Witnesses:
WM. LAW,
LOUIS K. GILLSON.